Sept. 15, 1964 W. ANGELE 3,148,547
AIR-SCREW ACCELEROMETER AND ODOMETER
Filed June 8, 1960 6 Sheets-Sheet 1
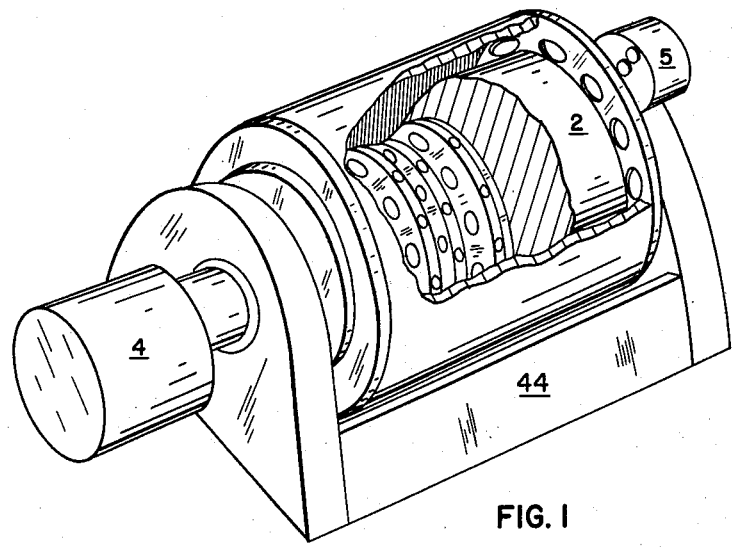
FIG. I
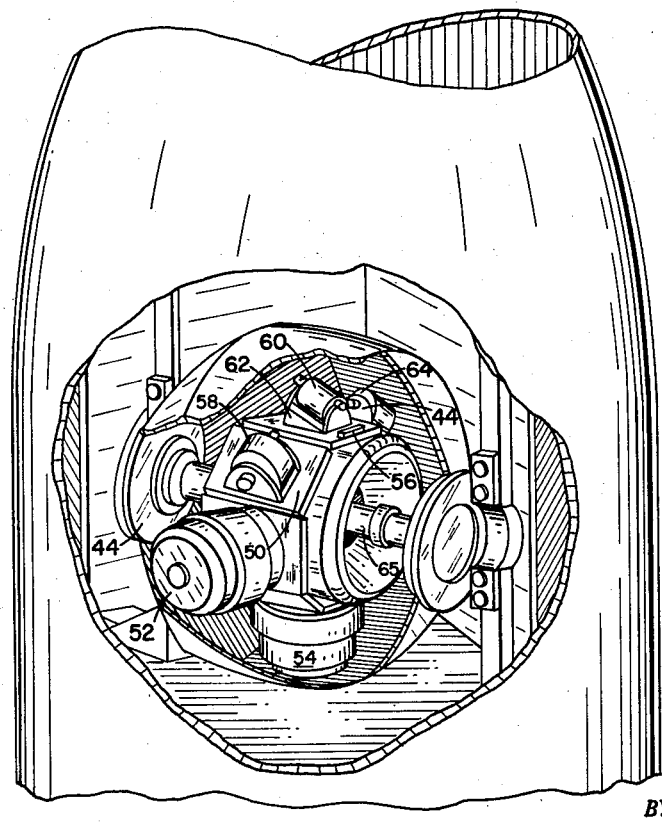
FIG. 12
Wilhelm Angele,
INVENTOR.
BY S. J. Rotondi,
A. T. Dupont,
and
Alvin E. Moore,
ATTORNEYS.

Sept. 15, 1964  W. ANGELE  3,148,547
AIR-SCREW ACCELEROMETER AND ODOMETER
Filed June 8, 1960  6 Sheets-Sheet 2

Wilhelm Angele,
INVENTOR.

BY S. J. Rotondi,
A. T. Dupont,
and
Alvin E. Moore,
ATTORNEYS.

Wilhelm Angele,
INVENTOR.

BY S. J. Rotondi,
A. T. Dupont,
and
Alvin E. Moore,
ATTORNEYS.

Sept. 15, 1964 W. ANGELE 3,148,547
AIR-SCREW ACCELEROMETER AND ODOMETER
Filed June 8, 1960 6 Sheets-Sheet 5

Wilhelm Angele,
INVENTOR.

BY S. J. Rotondi,
A. T. Dupont,
and
Alvin E. Moore,
ATTORNEYS.

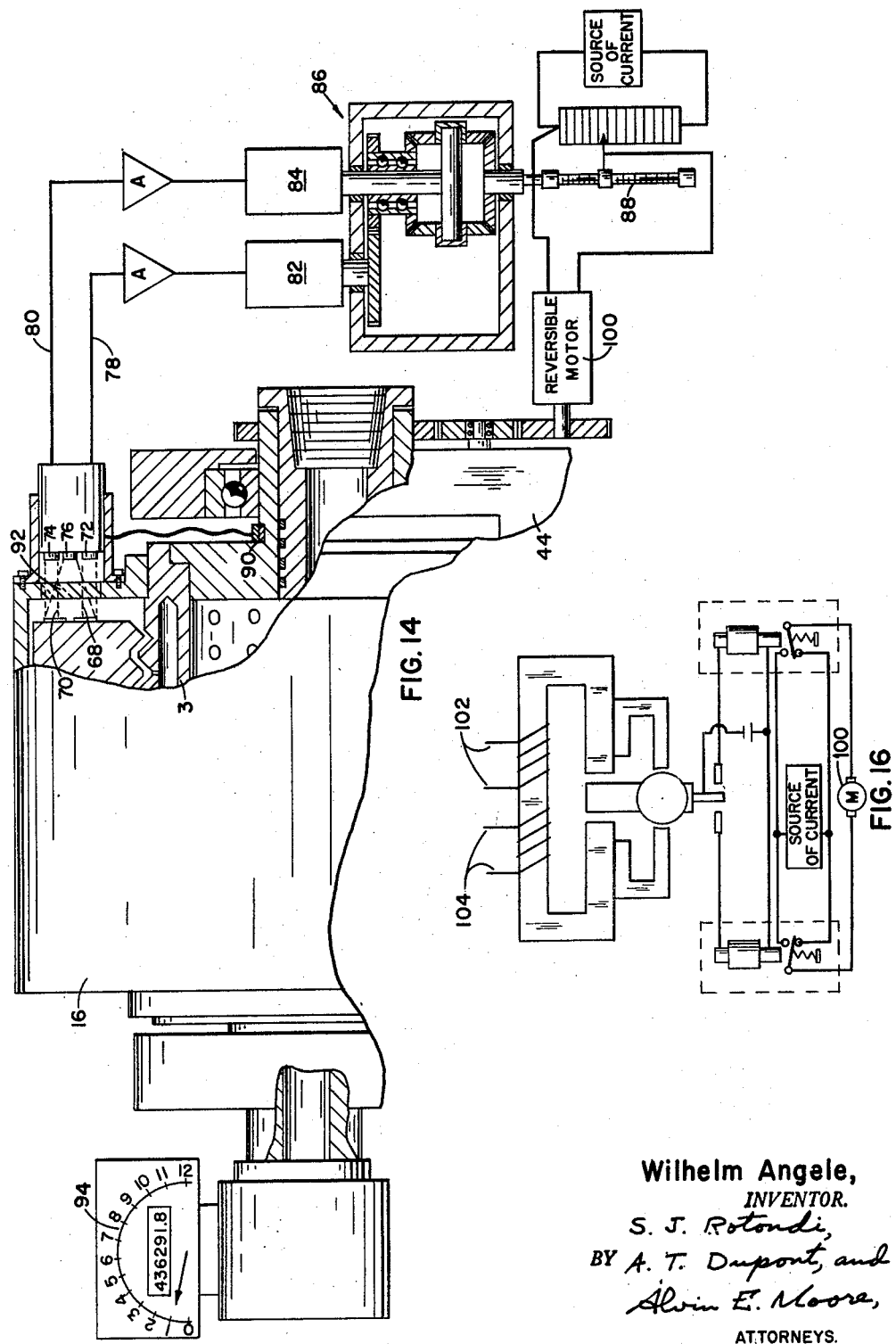

United States Patent Office 3,148,547
Patented Sept. 15, 1964

3,148,547
AIR-SCREW ACCELEROMETER AND ODOMETER
Wilhelm Angele, 2702 Scenic Drive SE., Huntsville, Ala.
Filed June 8, 1960, Ser. No. 34,847
9 Claims. (Cl. 73—490)
(Granted under Title 35, U.S. Code (1952), sec. 266)

This invention described herein may be manufactured and used by or for the Government for governmental purposes without the payment of any royalty thereon.

This invention relates to a screwthreaded, integrating accelerometer. It comprises a nut that is mounted by means of an air film on a screw, the nut being axially shifted and turned by accelerations, and the screw being correspondingly turned by a servo motor.

Conventional accelerometers are complicated and expensive, and tend to be somewhat inaccurate because of the friction of their numerous parts and their requirement for external computers. In the increasing use of automatically controlled missiles and other vehicles a simple, but accurate means for measuring accelerations is greatly needed.

Accordingly, it is an object of this invention to provide an accurate, simple, highly reliable accelerometer, useful in measuring accelerations to which its support is subjected, and which, when carried by a vehicle, also has utility in measuring the distance traversed by the vehicle.

A further object of this invention is to provide an instrument of the above type comprising a nut that is floatingly supported by an air film on a screw, the nut being turned by accelerations, and the screw being turned at a corresponding rotary speed by a servo motor.

Another object of the invention is to provide an air-bearing-screw accelerometer in combination with means for counting the revolutions of the screw, whereby the distance traveled by a supporting vehicle may be measured.

The foregoing and other objects will become more fully apparent from the following detailed description of exemplary structure embodying the invention and from the accompanying drawings, in which:

FIGURE 1 is a perspective view, partly in section, showing the accelerometer of the invention.

FIGURE 12 is an elevational view, partly broken away and partly in section, showing a ballistic missile with air-screw accelerometers mounted on its stabilized platform.

FIGURE 14 is a semi-schematic, elevational view of a second form of the pickkup system, comprising a rotating light.

FIGURE 16 is a schematic view of an alternative element in the system of FIGURE 15.

Figure 2:
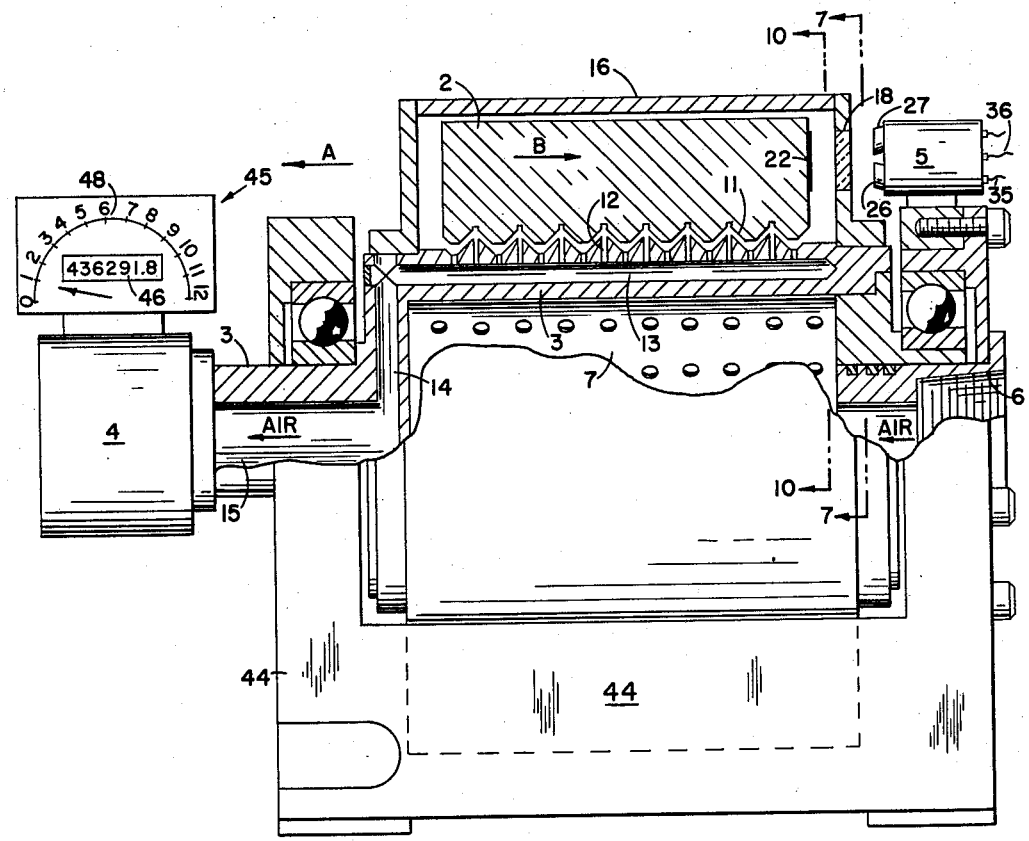
FIGURE 2 is a side elevational view of the instrument, shown partly in section along a plane thru the air-exhausting ducts.
Figure 3:
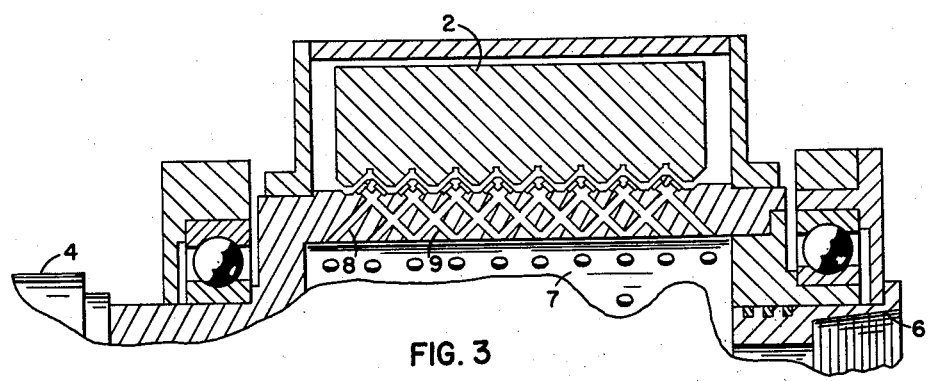
FIGURE 3 is a side elevational view of the instrument, shown partly in section along a plane thru the air-supplying conduits.

With especial reference to FIGURES 1 to 3; the invention is shown as comprising: an internally screw-threaded nut 2; an externally screw-threaded shaft enlargement (or equivalent bushing) 3, on which nut 2 is floated by means of an air-bearing film; a reversible, variable-speed, electric motor 4, drivably connected with shaft 3; and photoelectric device 5 which is stationary relative to elements 2 and 3.

Figure 4:
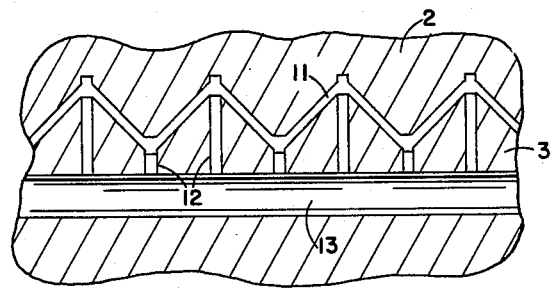
FIGURE 4 is an enlarged, sectional, detail view, indicating the arrangement of the air-exhausting conduits.
Figure 5:
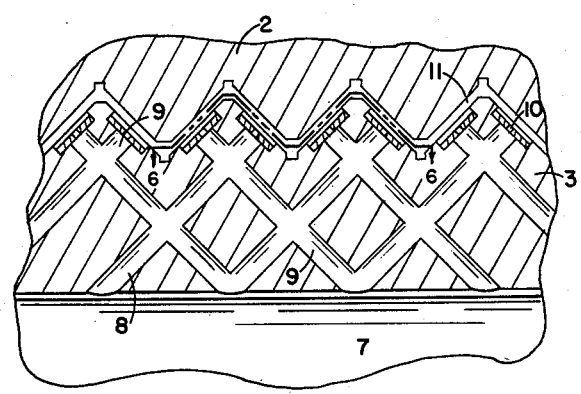
FIGURE 5 is an enlarged, sectional, detail view, indicating the air-supplying conduits.
Figure 6:
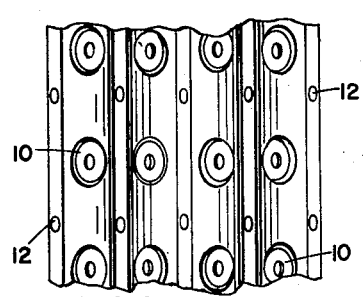
FIGURE 6 is a detail, plan view of a portion of the screwthreaded shaft, on which the acceleration-responsive nut turns, taken from lines 6—6 of FIGURE 5.

As indicated in FIGURES 3, 5 and 6, compressed air is supplied to the instrument thru a fitting screwed into element 6, via chamber 7 into conduits 8 and 9, and thru apertures 10 to clearance 11 between nut 2 and shaft or bushing 3. As indicated in FIGURES 2, 4 and 6, compressed air is exhausted from clearance 11 via conduits 12, 13, 14 and 15. The sectional planes of FIGURES 2 and 3 are angularly spaced from each other about the axis of shaft 3. There is a broad channel 13 for each axially aligned group of conduits; and each channel 13 is flow-connected to one of the radially arranged bores 14. All bores 14 are in communication with a single, axially-positioned channel 15. (In lieu of the plurality of bores 13, a single cylindrical space may be provided, as by fixing an annularly-recessed, externally threaded bushing on a cylinder that contains chamber 7.)

In practice, axial exhaust channel 15 is made sufficiently large in diameter to cause little or no back pressure of air in channels 14, 13 and 12.

In a satellite or vehicle in space the exhaust air from channel 15 would be connected with the suction inlet of an air pump. For short-range movements on or near the earth the air from the bearing film preferably would be discharged into the ambient air. For longer distances, even in the atmosphere, the exhaust air may be recirculated.

Differences of volume of the clearances 11 in different instruments and differences of centrifugal forces and of reaction forces at different portions of the flanks of the screwthreads set up differences of air pressures in these places. These pressures may be equalized, and the effect of coriolis forces (caused by air motion) may be minimized, by proper location, according to engineering data, of orifices 10 on the thread flanks. The main air inlet and outlet are coaxial; and in both the air is flowing in the same direction. The air deflection forces are balanced, so that no accuracy-disturbing torque results from them.

Preferably acceleration-responsive nut 2 and the screwthreaded portion of shaft 3 are housed in cylindrical casing 16, which is fixed to shaft 3. The purpose of this housing is to avoid any accuracy-disturbing, wind-exerted thrust on nut 2, and nearly to eliminate the skin friction on the nut's outer surface due to the fact that there is little difference between the angular speeds of the nut and its enveloping casing 16.

Figure 7:
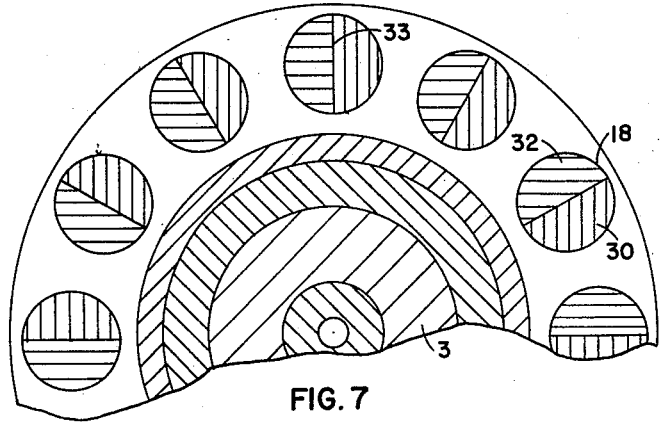
FIGURE 7 is a sectional view, partly broken away, taken from the plane 7—7 of FIGURE 2.
Figure 8:
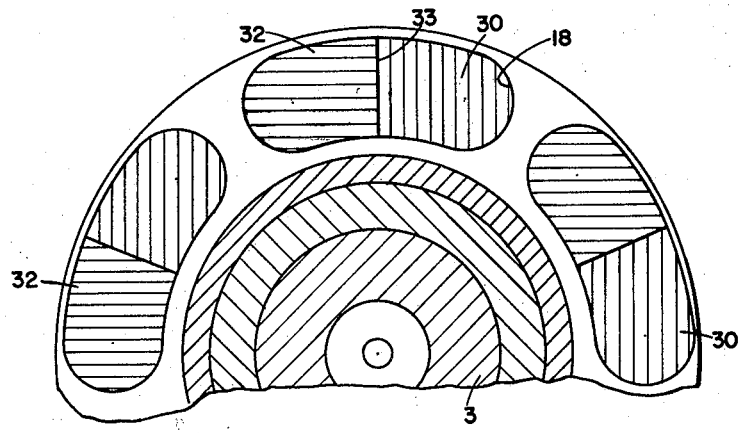
FIGURE 8 is a sectional view, similar to FIGURE 7, but showing an alternative shape of the windows for the light beam.

Housing 16 is provided with holes 18 in one of its end plates. These holes are closed by windows of transparent material, such as plexiglass or glass. Although only one hole 18 may be utilized, preferably there is an annularly arranged series of equally spaced apertures. These holes may be circular as shown in FIGURE 7 or in the form of annular segments as shown in FIGURE 8. During operation of the accelerometer a light beam is projected by photoelectric device 5 thru one or more of these apertures 18.

Figure 9:
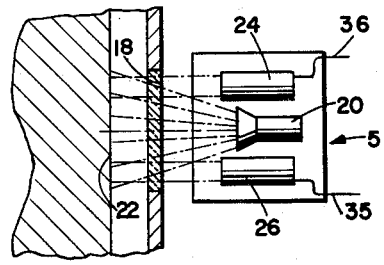
FIGURE 9 is a semi-schematic, detail view, partly in section, illustrating the manner in which the light beam is projected and reflected.

Photoelectric device 5, fixed to instrument support 44, may be any known light-sensitive instrument for sending an electrical signal when nut 2 moves relative to shaft 3. Preferably however, the device is of the type shown in FIGURE 9, which comprises: a white light projector 20, which throws a beam of light thru window 18; element 22, painted, enameled or plated on an end of acceleration nut 2, which reflects the light back thru the window (in a broad band); and two photoelectric cells 24 and 26 that are closely adjacent to projector 20. Although these cells are shown as arranged laterally of the projector in FIGURE 9, they may be radially arranged. In the latter event the colored arcuate areas are at different distances from the axis of rotation. If the cells are placed side by side below light-bulb holder 27, as indicated in FIGURE 2, the light beam preferably is pointed slightly downward from the holder, so that the light is reflected slightly downward from element 22 and thus upon photocells 24 and 26.

Figure 11:
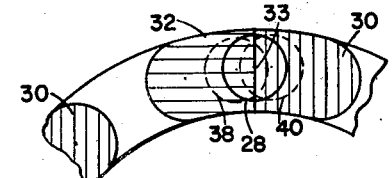
FIGURE 11 is a semi-schematic, detail, sectional, view illustrating shifts of the acceleration nut relative to the light beam.
Figure 10:
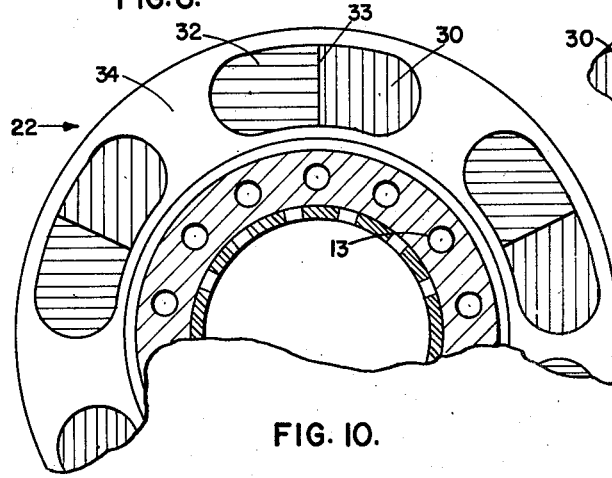
FIGURE 10 is a sectional view, partly broken away, taken from the plane 10—10 of FIGURE 2.

In FIGURES 10 and 11, each of the painted or enameled elements 22 is shown to be annular and made up of a red segment 30 and blue segment 32. The two differently colored segments are joined at vertical line 33. Between each pair of segments there is an area 34 of unpainted metal.

In FIGURE 11, the position of light beam 28 that comes thru a round window, 18, and falls on these segments, when the accelerometer is not subject to any acceleration, is schematically indicated by a full-line circle. Half of this circle 28 is on a red segment 30; and the other half is on a blue segment 32. In consequence, the light that is reflected from circle 28 onto photoelectric cells 24 and 26 is half red and half blue.

One of these cells (24) is sensitive only to red light, the other cell (26) only to blue light. Each cell sends an electric signal, via a conductor in conduit 35 or 36, to a known type of automatic, solenoid-actuated switch or amplifier which controls the operation of motor 4. As long as the signals from 24 and 26 are equal the motor is not started, or if it is already in operation its speed is unchanged. But when the acceleration-responsive nut and its painted areas, as viewed in FIGURE 11, move to the right the light beam falls on the dotted-line circle 38. Consequently, for the moment, the amounts of red and blue lights reflected to the photocells are no longer equal. Therefore, the band of light that is reflected to the photoelectric cells has more blue light than red, the current from cell 26 is stronger than that from cell 24, and the motor is accelerated in a direction to turn shaft 3 and apertures 18 to the right as viewed in FIGURE 7, thus tending to center the nut colors in the window, thru which for a moment the light is being reflected. During this moment, before the window turns out of the light beam, red light is reflected for a longer period than blue light. This is due to the fact that center line 33 is out of phase with the center of the window. As long as the acceleration continues, this out-of-phase relationship continues; but when the acceleration ceases the motor brings the phase shift between the nut and screw back to zero.

On the other hand, when segments 30 and 32 are moved (with nut 2) to the left, as viewed in FIGURE 11, the nut is screwed on shaft 3 in the opposite direction. Center line 33 then has a phase-shift to the right, as viewed in FIGURE 11, and the light beam falls on dotted-line circle 40. Accordingly, motor 4 is started in reverse or, if already in operation, is decelerated, so as to bring shaft 3 and nut 2 back into synchronism, with no phase-shift.

Conduits 35 and 36 also may comprise conductors that transmit electric signals from the photoelectric cells to an electrical computing means of known type for measuring the distance traversed by the support 44 and the instrument as a whole, by indicating the doubly integrated accelerations. This computer counts and integrates the pulses of light that are reflected thru the rotating windows on the photocells. For this purpose it is necessary to count the pulses from only one of the photocells. This computing and indicating means is calibrated to indicate the distance traversed by support 44, which distance is directly proportional to the number of turns of nut 2 and shaft 3. Also in comparing this number with time, with proper engineering calibration, the computer indicates speed (resulting from the integrated accelerations and decelerations to which support 44 has been subjected). In addition, in certain uses of the instrument on space vehicles, it will transmit the pulses of current to a telemetering device on the vehicle, which sends radio signals to a receiver on the earth, where the indications of turns of nut 2 are supplied to an electrical computer or indicator.

In lieu of or in addition to the above-described electrical indicator, a mechanical means 45 for indicating linear distance traveled and the integrated accelerations (speed) may be used. This means comprises a known type of revolution counter which is calibrated to indicate at 46 the distance traveled by support 44, which is directly proportional to the number of turns of nut 2 and shaft 3, and which also indicates at 48 the speed of the support or vehicle (which results from the integrated accelerations and decelerations to which the support has been subjected). Due to the fact that shaft 3 is accelerated and/or decelerated until its angular velocity is equal to that of nut 2, and because there is little or no friction between these two elements, the algebraic sum of the angular velocities of shaft 3 is substantially equal to that of the angular velocities of nut 2, and the average angular velocity of the nut is directly proportional to the average linear velocity of its support. Indicator 45 is calibrated relative to a constant to measure the velocity and distance in nautical miles (or other distance units).

Device 45 also may comprise a known type of signal-sending element, automatically actuated at a predetermined number of revolutions to send a signal current to a control device outside the presently disclosed instrument. If support 44 is fixed, for example, to the shell of a missile, a signal current of this nature may be utilized to terminate combustion in a stage or stages of the missile, to separate one stage from another, and to send signals to the earth as to the distance traversed by the vehicle.

As indicated in FIGURE 12, the accelerometer and odometer may be fixed to the gyroscopically stabilized platform, 50, of a ballistic missile or other space vehicle. Platform 50 is stabilized by means of three gyroscopes, only two of which (52 and 54) are shown in FIGURE 12. Prior to blastoff the top surface of the platform is maintained in a level position by means of two level-indicating instruments, one of which is shown at 56. At blastoff the missile, as illustrated, is substantially vertical.

Three instruments of the present invention are shown on the platform. Preferably, each is so mounted relative to the longitudinal (vertical) axis of the missile as to be able to stand the shock of the very high accelerations during the propulsive phase of the vehicle's flight. Instrument 58, which measures accelerations along the missile's longitudinal axis, is mounted for example so that its longitudinal axis is at a substantial angle to that of the missile. Instrument 60, which measures accelerations in yaw, is mounted on a block 62 that is inclined to the horizontal. And instrument 64, which measures accelerations about the pitch axis, also has its longitudinal axis inclined relative to the direction of the accelerations it measures. Instead of utilizing block 62, all the accelerometers may be placed with their axes inclined to the accelerations they measure measure by positioning axle 65 of platform 50 at any angle other than 90° to the longitudinal axis of the vehicle.

The purpose of the inclination of the axis of each of these instruments to the line of the accelerations it measures and indicates is to insure that the instrument is responsive only to a component of any large acceleration it encounters in a high-speed missile. Consequently the rotary speed of its motor and screwthreaded shaft is not excessive for safety.

When this inclined type of instrument mounting is utilized within the earth's gravity field the indicators of speed (integrated accelerations) and distance traveled are calibrated to compensate for the fact that only a component of any acceleration is measured, and also to obviate the effect of gravity on the instrument. With the instruments of FIGURE 12, a computer is used.

When the instrument is used to measure the accelerations of air-traversing missiles of the lower ranges of speed it is not necesary to mount it at an inclination to the horizontal plane. For example, in a fin-stabilized missile or rocket the instrument may be mounted with its longitudinal axis coincident with that of the missile and in a horizontal position that is continuously maintained by means of an automatic control system of the type shown in FIGURE 2 of Patent No. 2,926,530, to F. K. Mueller et al.

Another adaptation of the instrument is to mount it with its longitudinal axis in a stabilized horizontal plane, but at an angle to the line of the measured accelerations. In this use the instrument is not subject to the accuracy-disturbing effect of gravity, and yet is able to measure a large total amount of integrated accelerations without excessive rotational speed of the motor and shaft.

Figure 13:
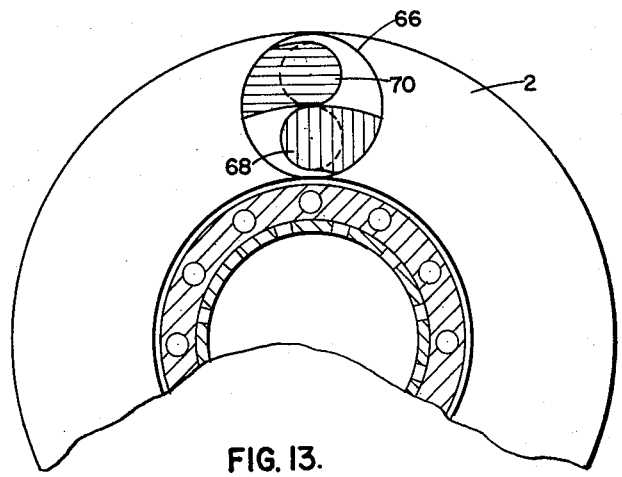
FIGURE 13 is a sectional view, similar to FIGURE 10, indicating a radial arrangement of the colored segments and photocells.

In FIGURES 13 and 14 there is shown another embodiment of the invention. In this form two radially arranged arcuate segments of colored painting or plating on an end of the acceleration-responsive nut are shown. The beam of white light from the projector is indicated by circle 66, the reflected red-light beam by circle 68 and blue-light beam by circle 70.

Reflected beam 68 falls on red-sensitive photocell 72 (FIGURE 14); reflected beam 70 on cell 74. These cells are radially arranged relative to projector 76 and to the axis of the nut and housing. They send signals via conduits 78 and 80 to red-light-responsive motor 82 and blue-light-responsive motor 84; these motors drive the two sides of differential gear 86, and gear 86 drives potentiometer screw 88. In accordance with the signals from the photocells, the potentiometer thus controls reversible servo motor 100, which drives screwthreaded shaft 3.

In this form of the invention the light projector (76) is shown as fixed to rotary housing 16 and receiving current via slip rings 90. Only one window 92 is utilized; it is preferably of the arcuate shape of windows 18 of FIGURE 8. As long as a given acceleration lasts, a substantially constant differential in the signals from photocells 72 and 74 exists. Since the light projector rotates with the screwthreaded shaft, there are no pulses of current to be counted in this form; and speedometer 94 indicates the integrated acceleration or speed.

Figure 15:
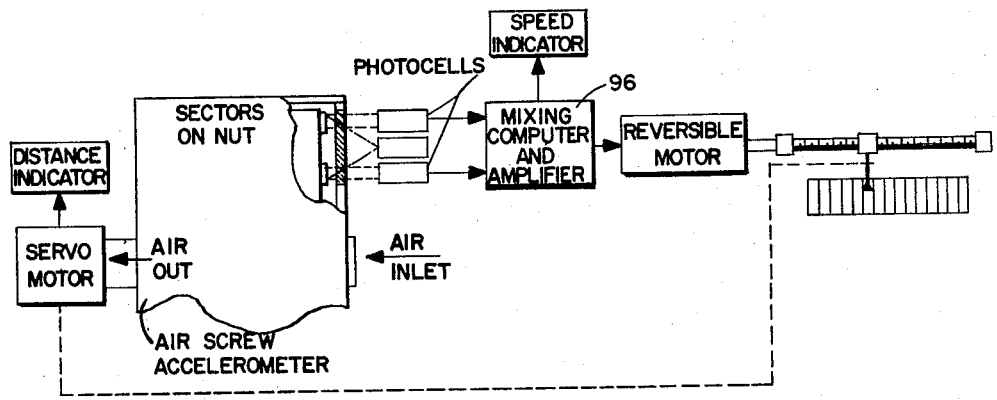
FIGURE 15 is a schematic view of a form of the invention that comprises a computer.

FIGURE 15 illustrates another embodiment of the invention, in which mixing computer 96, of a known type, has been substituted for the differential gear of FIGURE 14. Only one, reversible motor 98 is utilized. In lieu of the computer and motor of FIGURE 15, the polarized-relays controller and reversible motor 100 of FIGURE 16 may be utilized. Electrical conductors 102 transmit the signal from the red-light-responsive photocell; conductors 104 carry the blue-light-cell signal.

The accelerometer and odometer of the invention may be used for various measuring and indicating purposes, in many locations. In navigation, for instance, two instruments that measure accelerations and distances along two perpendicular lines (one, e.g., along the line of true north, and the other along an east-west line) may be used; and light pulses of the pickup, converted into electrical pulses, may be transmitted to a plotting table, where the position of the ship or submarine may be continually presented. In this use, the platform on which the accelerometer is mounted is oriented by means of a north-seeking gyroscope, so that the axis of one of the instruments is constantly pointing toward the north.

*Operation*

In the use of the device of the invention, support 44 may be affixed to any moving element. This element may be some linearly movable structure, for example a missile or space vehicle, aircraft, ship, submarine, or train. In a space vehicle, moving upward thru the atmosphere and space with motor 4 ahead of nut 2, for instance, the propulsive thrust imposes an acceleration on support 44 and shaft 3, in the direction of arrow A (FIGURE 2). Nut 2, floating on air, immediately begins to lag relative to shaft 3 in the direction of arrow B. But since the nut is screwthreadedly mounted it begins to unscrew, or turn from right to left, from the point of view of an observer looking at it from its rear. In an instant the circle of the painted or plated annulus 22 that is subtended by the light beam that is being projected from element 5 has moved from the position of circle 38 to that of circle 40. The light beam is then being reflected more from the red segment 30 than from the blue segment 32, and photocell 24 (sensitive only to red light) is supplying more current via conduit 36 then cell 26 (sensitive only to blue light) is supplying via conductor 34. Accordingly the motor control switch decreases the speed of motor 4 so that it rotates shaft 3 in the same angular direction as nut 2 is turning, tending to bring the shaft and its attached casing 16 into synchronism, phase angle zero, and the light beam back into position 28. As long as the acceleration of the vehicle continues, nut 2 continues to gain in speed, and the synchronizing rotation of shaft 3 also continues to accelerate. This is due to the fact that in this nearly frictionless instrument the thrust on its support is converted into torque, which creates angular velocity of the floating nut; and the accumulated velocity is proportional to the integrated accelerations that have given rise to that velocity. Because of the functioning of pickup 5 and the motor switch, this velocity of the nut is substantially equal to the speed of shaft 3, casing 16 and its apertures 18.

The number of turns of shaft 3 are counted by device 45 and indicated at 46; and the velocity of the shaft, calibrated to indicate integrated accelerations, is indicated at 48. In addition or in lieu of this indication, the pulses of current due to movement of holes 18 past the light beam from projector 5 may be supplied to a nearby electrical indicator or, via telemetering equipment, to a remotely located computer or indicator.

The invention comprehends various changes in structure from that herein illustrated, within the scope of the subjoined claims.

The following invention is claimed:

1. A device comprising: a support that is subject to accelerations; bearings on the support; a rotary element having screw threads on its outer surface, journaled in said bearings; an acceleration-responsive nut having a screwthreaded internal surface that is fitted on said screw threads with a clearance between said internal surface and threads; means, carried by said support, to supply compressed gas to said clearance; a motor drivably connected to said rotary element; means on said support for supplying an electrical signal current when relative movement between said nut and element occurs; and means connecting said signal current supplying means to said motor for varying the speed of said motor in response to the signal of said current.

2. A device as set forth in claim 1 which further comprises a casing, fixed to said rotary element and enveloping said nut, with clearance between said nut and casing at all points.

3. A device as set forth in claim 1, which further comprises calibrated indicator means drivably connected to said rotary element and responsive to changes in the velocity and corresponding integrated accelerations of said element.

4. A device as set forth in claim 1, which further comprises a revolution counter, drivably connected to said rotary element, said counter being calibrated to measure the distance traversed by said support.

5. An instrument as set forth in claim 2 in which said casing has an upright end wall, with an aperture in said wall; said instrument further including a photoelectric device mounted on said support adjacent said wall, said photoelectric device comprising a light projector for casting light thru said aperture and on an end of said nut, photoelectric means for receiving light reflected from said end and supplying an electric signal of a variation in the nature of said reflected light, and means electrically connecting said photoelectric means and said motor, for varying the speed of said motor in response to said signal; said device further comprising means on said end of the acceleration-responsive nut for varying the nature of the light reflected therefrom when the nut rotates relative to said rotary element.

6. An instrument as set forth in claim 5, in which said means on the nut for varying the nature of said light comprises two juxtaposed coatings of different colors, said coatings being joined along a line that is radial to the axis of said rotary element, said line being centered relative to said aperture when the nut and rotary element are in phase; and in which said photoelectric means comprises a pair of cells, one being sensitive to each of the colors of the light that is reflected from said coatings.

7. An instrument as set forth in claim 6, which further comprises a device, drivably connected to said rotary element and responsive to the rotational speed of said element, for indicating the integrated accelerations.

8. An instrument as set forth in claim 7, which further comprises a device, drivably connected to said rotary element and responsive to the number of revolutions of said rotary element, for indicating the distance traversed by said support.

9. In a vehicle subject to accelerations, a device for measuring and signalling the accelerations comprising: a support fixed to said vehicle; bearings on said support; a rotary element having screw threads on its outer surface, journaled in said bearings; an acceleration-responsive nut having a screwthreaded internal surface that is fitted on said screw threads with a clearance between said internal surface and threads; means, carried by said support, to supply compressed gas to said clearance; a motor drivably connected to said rotary element; means on said support for supplying an electrical signal current when relative movement between said nut and element occurs; and means connecting said signal current supplying means to said motor for varying the speed of said motor in response to the signal of said current.

References Cited in the file of this patent
UNITED STATES PATENTS

| | | |
|---|---|---|
| 2,591,921 | Cosgriff et al. | Apr. 8, 1952 |
| 2,948,152 | Meyer | Aug. 9, 1960 |